United States Patent [19]

Abel

[11] Patent Number: 4,911,104

[45] Date of Patent: Mar. 27, 1990

[54] FLEXIBLE STALL DIVIDER FOR FREE STALL BARN

[76] Inventor: Charles M. Abel, R.R. #5, Lacombe, Alberta, Canada, T0C 1S0

[21] Appl. No.: 337,967

[22] Filed: Apr. 14, 1989

[51] Int. Cl.[4] .............................................. A01K 1/00
[52] U.S. Cl. ........................................ 119/27; 119/11
[58] Field of Search ........................ 119/27, 61, 63, 11, 119/155; 160/192, DIG. 8

[56] References Cited

U.S. PATENT DOCUMENTS

| | | | |
|---|---|---|---|
| 1,294,366 | 2/1919 | Louden | 119/27 |
| 1,996,196 | 4/1935 | Ferris | 119/27 |
| 2,601,623 | 6/1952 | Norton | 119/27 |
| 2,642,037 | 6/1953 | Merrill | 119/27 |
| 3,421,478 | 1/1969 | Warmerdam | 119/27 |
| 3,726,257 | 4/1973 | Andersen | 119/27 |
| 3,802,392 | 4/1974 | Andersen | 119/27 |
| 4,217,860 | 8/1980 | Gloggler | 119/27 |
| 4,599,972 | 7/1986 | Kilburn | 119/27 |

FOREIGN PATENT DOCUMENTS 90470 10/1983 European Pat. Off. .............. 119/27

*Primary Examiner*—John Weiss
*Attorney, Agent, or Firm*—Adrian D. Battison; Stanley G. Ade; Murray E. Thrift

[57] ABSTRACT

A free stall barn of the type including an alley, a resting area for cattle on one side of the alley and a confining wall at a front of the resting area spaced from a step separating the resting area from the alley by a length approximately equal to the length of the animal includes a plurality of stall dividers dividing the rest area into separate stalls each for receiving one animal. Each stall divider comprises a vertical post mounted adjacent the step. Attached to the post is a bracket carrying a stub shaft which extends in a horizontal direction toward the wall. A coil spring on the end of the stub shaft mounts a single elongate rod member which projects from the post toward the wall and acts to divide each stall from the next. The spring allows the forward end of the rod member to flex to allow the animal to extricate its head or its body should it become trapped while attempting to stand from a lying position. The single rod is sufficient to cause the animal to remain confined within the stall. The device prevents animals from being injured or killed should they become entrapped in the stall dividing mechanism.

11 Claims, 2 Drawing Sheet

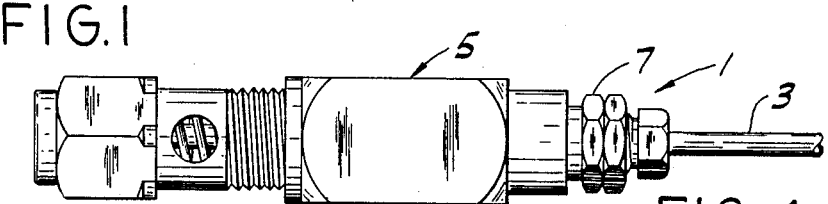
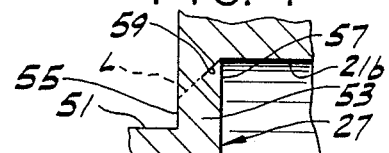
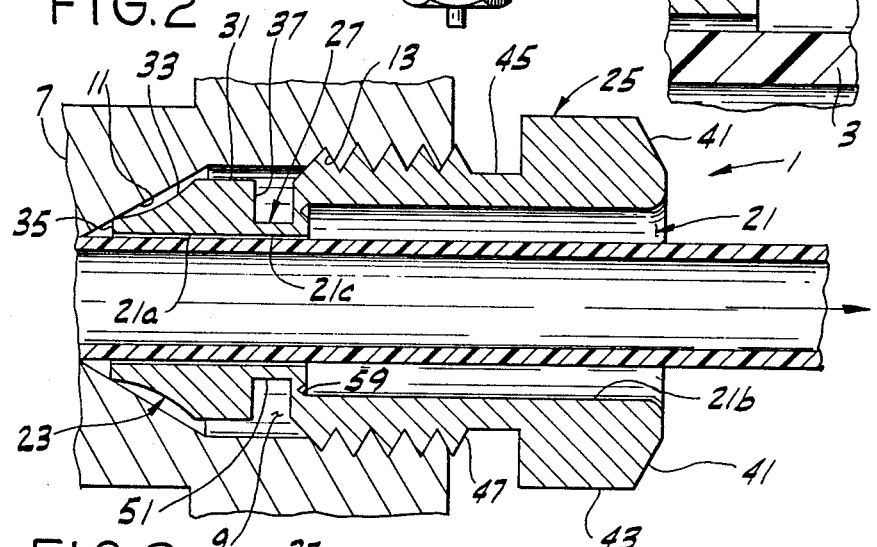
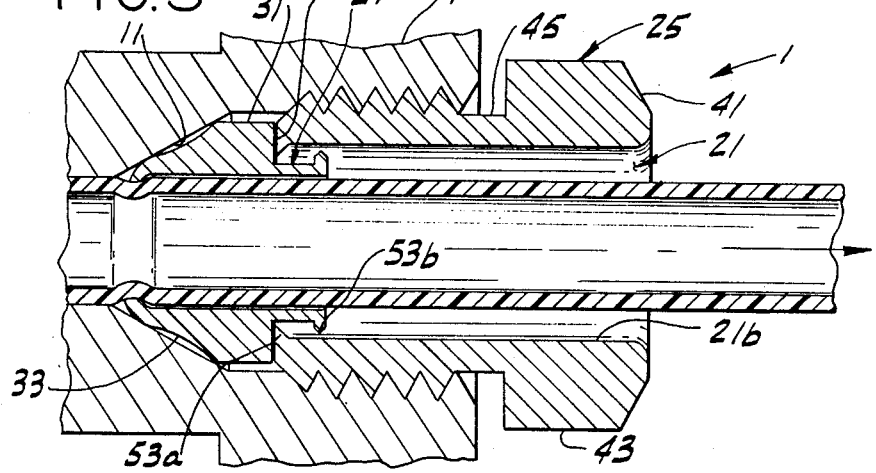

FLEXIBLE STALL DIVIDER FOR FREE STALL BARN

BACKGROUND OF THE INVENTION

This invention relates to a flexible stall divider for a free stall barn for use in the cattle industry.

In the dairy industry the cows are maintained in an intensive farming situation in barns for ease of handling.

In a tie stall or stanchion barn, the barn is designed with stalls to restrain the cow at a particular location at all times so that the cow can be milked, fed and otherwise attended to. In stalls of this type, the cow is carefully restrained so that it is maintained in proper position during the required processing. In addition, the cow can lie at the restrained position in the stall, but its head is maintained restrained so that it cannot move from side to side with the danger of becoming trapped.

As an alternative to the tie stall barn, more recent developments have moved toward free stall barn arrangement which is intended for defining resting areas for the animals while they are not feeding, being milked or other necessary steps. Generally a free stall barn of this type comprises an alley way along which the animals can move basically at their own volition from a separate milking parlor or from a feeding station provided in the free stall barn. From the alley way the animal can select one of a number of different resting sites or stalls which are defined within the barn on resting areas by stall dividers. The resting area is provided immediately adjacent the alley way and is raised from the alley way by a step. The resting area is thus separated from the alley way with the intention of the resting area being maintained in a clean condition free from excrement. The stall dividers are set out on the resting area so that from the alley way an elongate area is defined into which the animal can enter from the alley way with the dividers providing just sufficient room for the animal to get into the area and then lie down facing away from the alley way. A vertical wall is provided at a forward end of the stall area so as to confine the animal. The length of the stall is arranged so that it just receives the length of the animal with the rear end of the animal at or slightly beyond the step separating the resting area from the alley. In this way the animal is generally trained to ensure that excrement falls into the alley way rather than onto the resting area.

Conventionally the stall dividers comprise an elongate bar extending from the step between the resting area and the alley way to a position closely adjacent the front wall with the bar fixed at both ends on vertical posts attached to the floor of the resting area. These simple dividing members while generally satisfactory for dividing one stall from the next have a serious problem in that the animal can in some cases be come trapped under the rigid bar when trying to raise to standing position and this can cause injury or even death.

U.S. Pat. No. 3,802,392 (Andersen) discloses an alternative form of stall divider for use in this situation. Specifically in this design the front wall, instead of a plain vertical wall, consists of a number of vertical posts on which are supported a pair of horizontal rails. The stall divider comprises a U-shaped member which has the legs of the U-shape arranged in horizontal orientation with a forward end of each of the legs attached to a respective one of the horizontal rails. The base of the U-shape is free from connection to the ground so that the whole of the stall divider is cantilevered from the front rails. It is stated that this avoids the necessity of a support post adjacent the rear end of the stall since the rear end of the stall is more likely to receive excrement which can cause corrosion of any supporting posts. It is appreciated by Andersen that the animal can become trapped under the stall divider and for this purpose the patent provides that the U-shaped member can be readily removed from sleeve type couplings mounted on the horizontal rails.

However this device is generally unsatisfactory in that the danger of entrapping the animal as it tries to stand is significantly increased. While the animal may be quickly removed, it can before removal suffer serious injury and even die before the handler appreciates the problem. Cows tend to move forwardly as they stand from a lying position. The head of the animal is therefore pushed forwardly as it stands so that the horizontal rails and the horizontal legs of the divider member provide significant opportunity for the head of the animal to become entrapped.

U.S. Pat. No. 3,726,257 (Andersen) is closely related to the above patent and shows a similar construction.

U.S. Pat. Nos. 3,421,478 (Warmerdam) and 2,642,037 (Merrill) disclose stall dividers of a somewhat similar nature defined by fixed rails which again have the problem that the animal can become entrapped when trying to stand.

U.S. Pat. Nos. 1,294,366 (Louden), 2,601,323 (Norton) and 1,996,196 (Ferris) disclose stall divider constructions for use in a tie stall or stanchion barn in which the animal is intended to be retained in a standing position for feeding, milking or other operations, and when lying has its head remaining restrained so that it is prevented from becoming entrapped. In Louden the divider members are formed by arc shape rails which are coupled at the forward end to the stanchion but are to some extent free to pivot from side to side. It will be appreciated however that in this circumstance, the animal is intended to be maintained in the restraints at the forward end and hence there is little or no problem of the animal becoming entrapped when trying to stand. Similarly Ferris discloses a stanchion of the type described in which the dividers are supported in cantilever manner at the stanchion and can pivot about a vertical axis defined by a vertical post of the stanchion. In Norton a confining member in the shape of a horizontal loop is fastened to a vertical post of the stanchion to more effectively confine the shoulders of the animal and restrict side to side movement. In both of the above patents there is little or no possibility of the animal becoming entrapped due to the necessary restraints. However the construction is of a type which would cause a severe problem of entrapment should the animal wish to stand from a lying position while unrestrained as in a free stall barn.

SUMMARY OF THE INVENTION

It is one objective of the present invention, therefore, to provide an improved stall divider for a free stall barn which provides an effective dividing of one stall from another while reducing the danger of the animal becoming entrapped when it wishes to rise from a lying position.

According to the first aspect of the invention, therefore, there is provided, in a free stall barn for cattle comprising an access alley along which the cattle can move, a resting area raised from the alley on one side of the alley, and wall means defining on the resting area a front restriction for the cow spaced from the alley by a distance just sufficient to receive the cow on the resting area facing the wall means, the improvement comprising stall divider mean for separating the resting area into a plurality of separate resting sites, the stall divider means comprising a post member, means mounting the post member at a position on the resting area adjacent the alley, a divider member mounted on the post and arranged to project therefrom forwardly toward the wall means, and means providing a flexible coupling such that a forward portion of the divider member is free to flex relative to the post.

According to the second aspect of the invention, therefore, there is provided a free stall barn for cattle comprising an access alley along which the cattle can move, a resting area raised by a step from the alley on one side of the alley, and wall means defining on the resting area a front restriction for the cow spaced from the alley by a distance just sufficient to receive the cow on the resting area facing the wall means, and stall divider means for separating the resting area into a plurality of separate resting sites, the stall divider means comprising a post member, means mounting the post member at a position on the resting area adjacent the step, a divider member in the form of a single elongate rod member, a stub member mounted on the post and arranged to project therefrom forwardly toward the wall means, and a coil spring having one end wrapped around the stub member so as to be supported thereby and the other end of the coil spring wrapped around the rod member so as to support the rod member from the post in cantilever arrangement such that a forward portion of the rod member is free to flex relative to the post.

The use of a single elongate rod member as the stall divider provides an effective dividing action. However the elongate rod member is mounted firstly at the rear end of the stall adjacent the alley rather than at the forward end of the stall adjacent the wall and secondly the rod is mounted in a manner which allows the forward end to flex both in a horizontal and vertical direction. The animal is sufficiently restrained by the elongate rod to maintain it in position but should the animal when rising get into a position with its head beneath or in contact with the rod, the flexibility is sufficient that the animal can extricate its head and stand without sustaining injury.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which.

DESCRIPTION OF THE DRAWINGS

FIG. 1 is an isometric view showing part of a free stall barn including stall dividers according to the invention;

FIG. 2 is a top plan view of one of the stall dividers o FIG. 1;

FIG. 3 is a side elevational view on enlarged scale of one of the stall dividers;

In the drawings like characters of reference indicate corresponding parts in the different figures.

DETAILED DESCRIPTION

The free stall barn of FIG. 1 comprises an alley 10 along which the animals can move at their own volition. A rest area 11 is provided on one side of the alley and is divided from the alley by a step 12. Generally the alley and the step are formed from a cast concrete so that they are smooth and of consistent dimension to allow the alley to be scraped for cleaning of excrement material.

The raised resting area can similarly be formed of concrete or merely of flattened earth and can receive bedding material if required. The forward end of the resting area is closed by a vertical wall 13 which is flat and substantially free from openings and projections so that nothing on the wall which can injure the animal or trap the animal's head.

The individual stalls on the resting area are defined by a plurality of stall dividing elements indicated generally at 14. Each stall dividing element comprises a post 15 which is formed for example of 1½" diameter pipe embedded into the cast concrete forming the step 12 so the post is fixed in a vertical position at the required spacing just sufficient to receive the width of the animal.

A stall dividing member is mounted on the post so that it projects from the post towards the wall 13 but is spaced from the wall 13 as best shown in FIG. 2. The dividing member comprises an elongate rod member 16 which can for example be formed from pipe again of 1½" diameter. The rod members are of a length so that each extends substantially the whole of the distance from the post 15 to the wall 13.

The simple single elongate rod 16 is attache to the post 15 by a coil spring 17 which has a portion wrapped around the inner end of the rod member 16 and a portion wrapped around a stub shaft 18. The coil spring as shown in FIG. 3 thus allows flexibility between the stub shaft 18 and the rod member 16 so that with the stub shaft 18 fixed to the pipe the rod member is free to flex from its normal directly horizontal position in both vertical and horizontal directions.

The stub shaft 18 is formed from the same pipe as the rod 16 and is welded to a bracket 19 which has a flat front face 20 and a semi-cylindrical rear face which wraps around the outer surface of the vertical post 15. The bracket 19 has a hole from the front surface through to the semi-cylindrical surface so that a bolt 21 can extend through the hole in the bracket and through a cooperating hole in the upper part of the post 15. A nut 22 clamps the bracket 19 onto the post at a fixed location. The cooperation between the post and the semi-circular rear surfaces of the bracket prevents it from twisting on the post while the bolt 21 holds it at a required height and prevents it from rotating around the post. Thus the stub shaft 18 is fixed in horizontal orientation projecting directly toward the wall 13. The coil spring 17 thus maintains the dividing rod 16 in the required horizontal orientation.

The strength of the spring 17 is such that the rod has sufficient return force to its normal position to inhibit the animal from pushing the bar and moving into an adjacent stall space. However the flexibility of this spring 17 is such that should the animal get its head underneath the rod member, the rod member will flex sufficiently to enable the animal to lift its head while standing and to pull its head out from the entrapped position.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In a free stall barn for cattle comprising an access alley along which the cattle can move, a resting area raised from the alley on one side of the alley, and wall means defining on the resting area a front restriction for the cow spaced from the alley by a distance just sufficient to receive the cow on the resting area facing the wall means, the improvement comprising stall divider means for separating the resting area into a plurality of separate resting sites, the stall divider means comprising a post member, means mounting the post member at a position on the resting area adjacent the alley, a divider member mounted on the post and arranged to project therefrom forwardly toward the wall means, and means providing a flexible coupling such that a forward portion of the divider member is free to flex relative to the post.

2. The invention according to claim 1 wherein the wall means comprises a fixed vertical wall free from restraint means and free from members inhibiting standing or lying movements of the animal such that the animal is free to move at will toward and away from the wall and is free to stand or lie adjacent the wall.

3. The invention according to claim 1 wherein the divider member comprises a single elongate rod member.

4. The invention according to claim 1 wherein the flexible coupling means is arranged to allow flexing movement of the forward portion in both vertical and horizontal directions.

5. The invention according to claim 4 wherein the flexible coupling means comprises a coil spring having one end attached to the post and an opposed end attached to the divider member.

6. The invention according to claim 1 wherein the post comprises a single vertical post supported from a floor of the resting area and separate from posts of the other ones of the stall divider means.

7. The invention according to claim 1 including a stub member mounted on the post and projecting forwardly therefrom toward the wall, a coil spring having one end wrapped around the stub member so as to be supported thereby and the other end of the coil spring wrapped around a rearward portion of the divider member with the forward portion of the divider member being supported from the coil spring in cantilever arrangement such that the coil spring allows said flexing of the divider member relative to the post.

8. A free stall barn for cattle comprising an access alley along which the cattle can move, a resting area raised by a step from the alley on one side of the alley, and wall means defining on the resting area a front restriction for the cow spaced from the alley by a distance just sufficient to receive the cow on the resting area facing the wall means, and stall divider means for separating the resting area into a plurality of separate resting sites, the stall divider means comprising a post member, means mounting the post member at a position on the resting area adjacent the step, a divider member in the form of a single elongate rod member, a stub member mounted on the post and arranged to project therefrom forwardly toward the wall means, and a coil spring having one end wrapped around the stub member so as to be supported thereby and the other end of the coil spring wrapped around the rod member so as to support the rod member from the post in cantilever arrangement such that a forward portion of the rod member is free to flex relative to the post.

9. The invention according to claim 8 wherein the wall means comprises a fixed vertical wall free from restraint means and free from members inhibiting standing or lying movements of the animal such that the animal is free to move at will toward and away from the wall and is free to stand or lie adjacent the wall.

10. The invention according to claim 8 wherein the post comprises a single vertical post supported from a floor of the resting area and separate from posts of the other ones of the stall divider means.

11. The invention according to claim 8 wherein the post comprises a single vertical tubular member mounted and supported by a floor of the resting area and wherein the stub member is supported on a bracket separate from the post, the bracket having a cross-section in a horizontal plane which is C-shaped so as to wrap around a part of the periphery of the post for clamping thereto.

* * * * *

UNITED STATES PATENT AND TRADEMARK OFFICE
CERTIFICATE OF CORRECTION

PATENT NO. : 4,911,104

DATED : March 27, 1990

INVENTOR(S) : Charles M. Abel

Page 1 of 4

It is certified that error appears in the above-identified patent and that said Letters Patent is hereby corrected as shown below:

The title page should be deleted to appear as per attached title page.

The sheet of drawings consisting of Figs. 1-4, should be deleted to be replaced with the sheet of drawings consisting of Fifs. 1-3, as shown on the attached pages.

Signed and Sealed this

Third Day of March, 1992

Attest:

HARRY F. MANBECK, JR.

Attesting Officer

Commissioner of Patents and Trademarks

United States Patent [19]
Abel

[11] Patent Number: 4,911,104
[45] Date of Patent: Mar. 27, 1990

[54] FLEXIBLE STALL DIVIDER FOR FREE STALL BARN

[76] Inventor: Charles M. Abel, R.R. #5, Lacombe, Alberta, Canada, T0C 1S0

[21] Appl. No.: 337,967

[22] Filed: Apr. 14, 1989

[51] Int. Cl.$^4$ ............................................. A01K 1/00
[52] U.S. Cl. ........................................ 119/27; 119/11
[58] Field of Search ............... 119/27, 61, 63, 11, 119/155; 160/192, DIG. 8

[56] References Cited

U.S. PATENT DOCUMENTS

| | | | |
|---|---|---|---|
| 1,294,366 | 2/1919 | Louden | 119/27 |
| 1,996,196 | 4/1935 | Ferris | 119/27 |
| 2,601,623 | 6/1952 | Norton | 119/27 |
| 2,642,037 | 6/1953 | Merrill | 119/27 |
| 3,421,478 | 1/1969 | Warmerdam | 119/27 |
| 3,726,257 | 4/1973 | Andersen | 119/27 |
| 3,802,392 | 4/1974 | Andersen | 119/27 |
| 4,217,860 | 8/1980 | Gloggler | 119/27 |
| 4,599,972 | 7/1986 | Kilburn | 119/27 |

FOREIGN PATENT DOCUMENTS 90470 10/1983 European Pat. Off. ............... 119/27

Primary Examiner—John Weiss
Attorney, Agent, or Firm—Adrian D. Battison; Stanley G. Ade; Murray E. Thrift

[57] ABSTRACT

A free stall barn of the type including an alley, a resting area for cattle on one side of the alley and a confining wall at a front of the resting area spaced from a step separating the resting area from the alley by a length approximately equal to the length of the animal includes a plurality of stall dividers dividing the rest area into separate stalls each for receiving one animal. Each stall divider comprises a vertical post mounted adjacent the step. Attached to the post is a bracket carrying a stub shaft which extends in a horizontal direction toward the wall. A coil spring on the end of the stub shaft mounts a single elongate rod member which projects from the post toward the wall and acts to divide each stall from the next. The spring allows the forward end of the rod member to flex to allow the animal to extricate its head or its body should it become trapped while attempting to stand from a lying position. The single rod is sufficient to cause the animal to remain confined within the stall. The device prevents animals from being injured or killed should they become entrapped in the stall dividing mechanism.

11 Claims, 2 Drawing Sheet

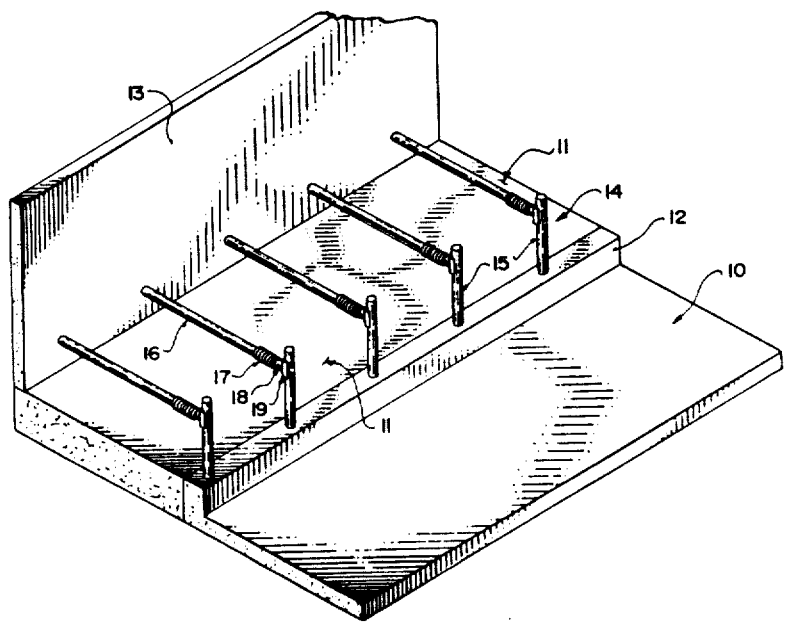

UNITED STATES PATENT AND TRADEMARK OFFICE
CERTIFICATE OF CORRECTION

PATENT NO. : 4,911,104

DATED : March 27, 1990

INVENTOR(S) : Charles M. Abel

Page 3 of 4

It is certified that error appears in the above-identified patent and that said Letters Patent is hereby corrected as shown below:

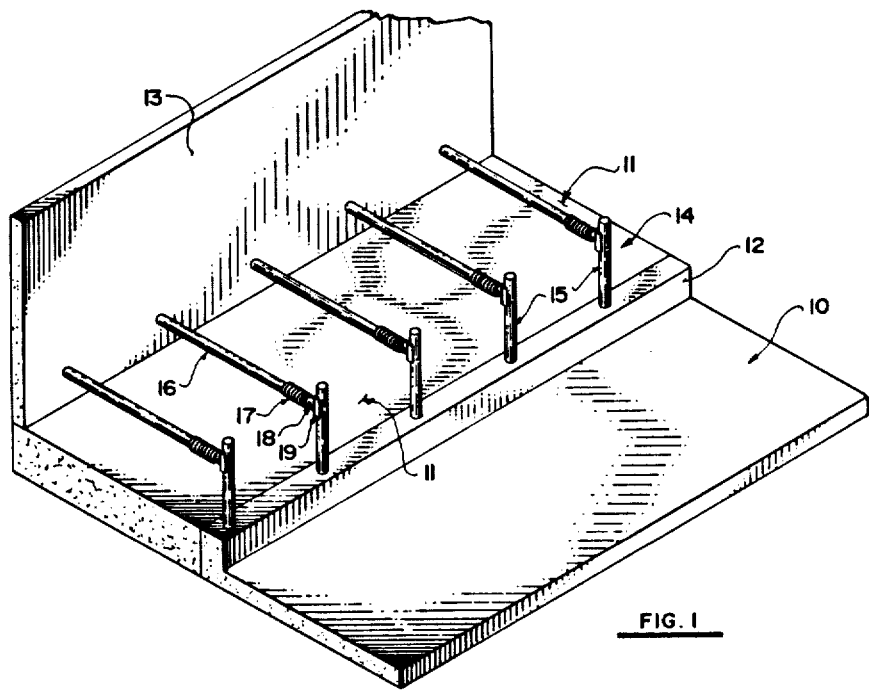

FIG. 1

UNITED STATES PATENT AND TRADEMARK OFFICE
CERTIFICATE OF CORRECTION

PATENT NO. : 4,911,104
DATED : March 27, 1990
INVENTOR(S) : Charles M. Abel

It is certified that error appears in the above-identified patent and that said Letters Patent is hereby corrected as shown below:

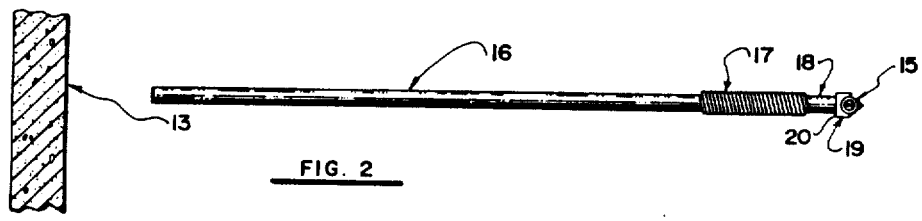

FIG. 2

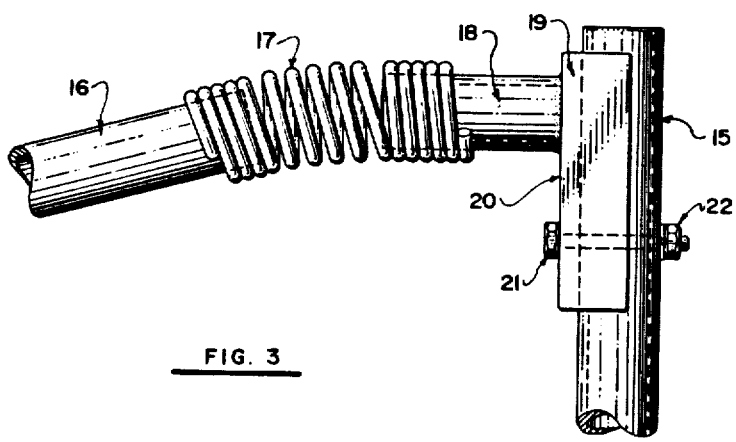

FIG. 3